(12) United States Patent
Roden

(10) Patent No.: US 10,207,588 B1
(45) Date of Patent: Feb. 19, 2019

(54) VEHICLE TURBINE CHARGING SYSTEM

(71) Applicant: William Roden, Clyde, TX (US)

(72) Inventor: William Roden, Clyde, TX (US)

( * ) Notice: Subject to any disclaimer, the term of this patent is extended or adjusted under 35 U.S.C. 154(b) by 0 days.

(21) Appl. No.: 15/602,335

(22) Filed: May 23, 2017

(51) Int. Cl.
H02K 7/00 (2006.01)
B60L 7/18 (2006.01)
F03D 9/25 (2016.01)
F03D 9/32 (2016.01)
B60R 16/033 (2006.01)
H02K 7/18 (2006.01)

(52) U.S. Cl.
CPC .............. *B60L 7/18* (2013.01); *B60R 16/033* (2013.01); *F03D 9/25* (2016.05); *F03D 9/32* (2016.05); *H02K 7/1823* (2013.01); *H02K 7/1853* (2013.01); *F05B 2240/941* (2013.01)

(58) Field of Classification Search
CPC . F03D 9/32; F03D 9/25; B60R 16/033; F05B 2240/941
USPC .......................... 290/1 R, 44, 55; 180/2.1, 2.2
See application file for complete search history.

(56) References Cited

U.S. PATENT DOCUMENTS

| | | | | |
|---|---|---|---|---|
| 3,444,946 A * | 5/1969 | Waterbury | ................ | B60K 6/46 180/2.2 |
| 3,513,326 A * | 5/1970 | Potts | ....................... | B60K 16/00 290/55 |
| 3,556,239 A * | 1/1971 | Spahn | ...................... | B60K 1/00 180/65.25 |
| 3,876,925 A * | 4/1975 | Stoeckert | ............... | B60K 16/00 322/1 |
| 4,019,828 A * | 4/1977 | Bunzer | .................. | B60K 16/00 416/55 |
| 4,168,759 A * | 9/1979 | Hull | ....................... | B60K 16/00 180/2.2 |
| D272,332 S | 1/1984 | Ritchie | | |
| 5,680,032 A | 10/1997 | Pena | | |
| 5,920,127 A * | 7/1999 | Damron | ................. | B60K 16/00 290/44 |
| 5,986,429 A | 11/1999 | Mula, Jr. | | |
| 6,138,781 A * | 10/2000 | Hakala | ................... | B60K 16/00 180/2.2 |
| 6,373,145 B1 * | 4/2002 | Hamrick | ............... | B60K 16/00 290/44 |

(Continued)

FOREIGN PATENT DOCUMENTS

WO 2007110874 A1 10/2007

*Primary Examiner* — Julio Gonzalez

(57) ABSTRACT

The vehicle turbine charging system is adapted for use with a vehicle. The vehicle is further defined with one or more body panels, a brake system, and an electrical system. The electrical system is further defined with a brake signal and a battery. The vehicle turbine charging system is a regenerative braking device. The operation of the vehicle turbine charging system is initiated upon the application of the brake system on the vehicle. The vehicle turbine charging system comprises one or more regeneration devices. Each individual regeneration device selected from the one or more regeneration devices diverts air flow from around the vehicle through the turbine. The turbine powers the regeneration circuit to provide electrical energy that recharges battery. The control circuit opens and closes the intake that diverts the air flow to the turbine. The intake is open during brake system operation and is otherwise closed.

6 Claims, 5 Drawing Sheets

(56) References Cited

U.S. PATENT DOCUMENTS

| | | | | |
|---|---|---|---|---|
| 7,135,786 | B1 * | 11/2006 | Deets | B60K 16/00 290/55 |
| 7,398,841 | B2 | 7/2008 | Kaufman | |
| 7,808,121 | B1 | 10/2010 | Glynn | |
| 7,810,589 | B2 * | 10/2010 | Frierman | B60K 16/00 180/2.2 |
| 7,997,371 | B2 * | 8/2011 | Khymych | B60K 16/00 180/165 |
| 8,710,691 | B2 | 4/2014 | Haddad | |
| 2001/0011825 | A1 * | 8/2001 | de Vega | B60K 16/00 290/55 |
| 2003/0057707 | A1 * | 3/2003 | Wu | B60K 16/00 290/55 |
| 2003/0155464 | A1 * | 8/2003 | Tseng | B60K 16/00 244/58 |
| 2010/0140006 | A1 * | 6/2010 | Frierman | B60K 16/00 180/165 |
| 2011/0203858 | A1 * | 8/2011 | Chanel | B62D 35/007 180/2.1 |
| 2011/0266075 | A1 * | 11/2011 | Guzelimian | B60K 16/00 180/2.2 |
| 2011/0268565 | A1 * | 11/2011 | Alvi | F03B 17/062 415/182.1 |
| 2013/0101502 | A1 * | 4/2013 | McAlister | B60T 1/00 423/648.1 |
| 2013/0127393 | A1 * | 5/2013 | Garcia | F03D 3/002 320/101 |
| 2014/0001760 | A1 * | 1/2014 | Hembree | B60L 8/006 290/52 |
| 2014/0090366 | A1 * | 4/2014 | Akbar | B60K 16/00 60/398 |
| 2017/0342964 | A1 * | 11/2017 | Cianflone | F03D 9/32 |

\* cited by examiner

VEHICLE TURBINE CHARGING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles in general, more specifically, an arrangement incorporating an auxiliary power drive with an air intake for a vehicle.

Summary of Invention

The vehicle turbine charging system is adapted for use with a vehicle. The vehicle is further defined with one or more body panels, a brake system, and an electrical system. The electrical system is further defined with a brake signal and a battery. The vehicle turbine charging system is a regenerative braking device. The operation of the vehicle turbine charging system is initiated upon the application of the brake system on the vehicle. The vehicle turbine charging system comprises one or more regeneration devices. Each individual regeneration device selected from the one or more regeneration devices diverts air flow from around the vehicle through the turbine. The turbine powers the regeneration circuit to provide electrical energy that recharges battery. The control circuit opens and closes the intake that diverts the air flow to the turbine. The intake is open during brake system operation and is otherwise closed.

These together with additional objects, features and advantages of the vehicle turbine charging system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle turbine charging system in detail, it is to be understood that the vehicle turbine charging system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle turbine charging system.

It is therefore important that the claims be regarded as including such equivalent construction insofar as they do not depart from the spirit and scope of the vehicle turbine charging system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
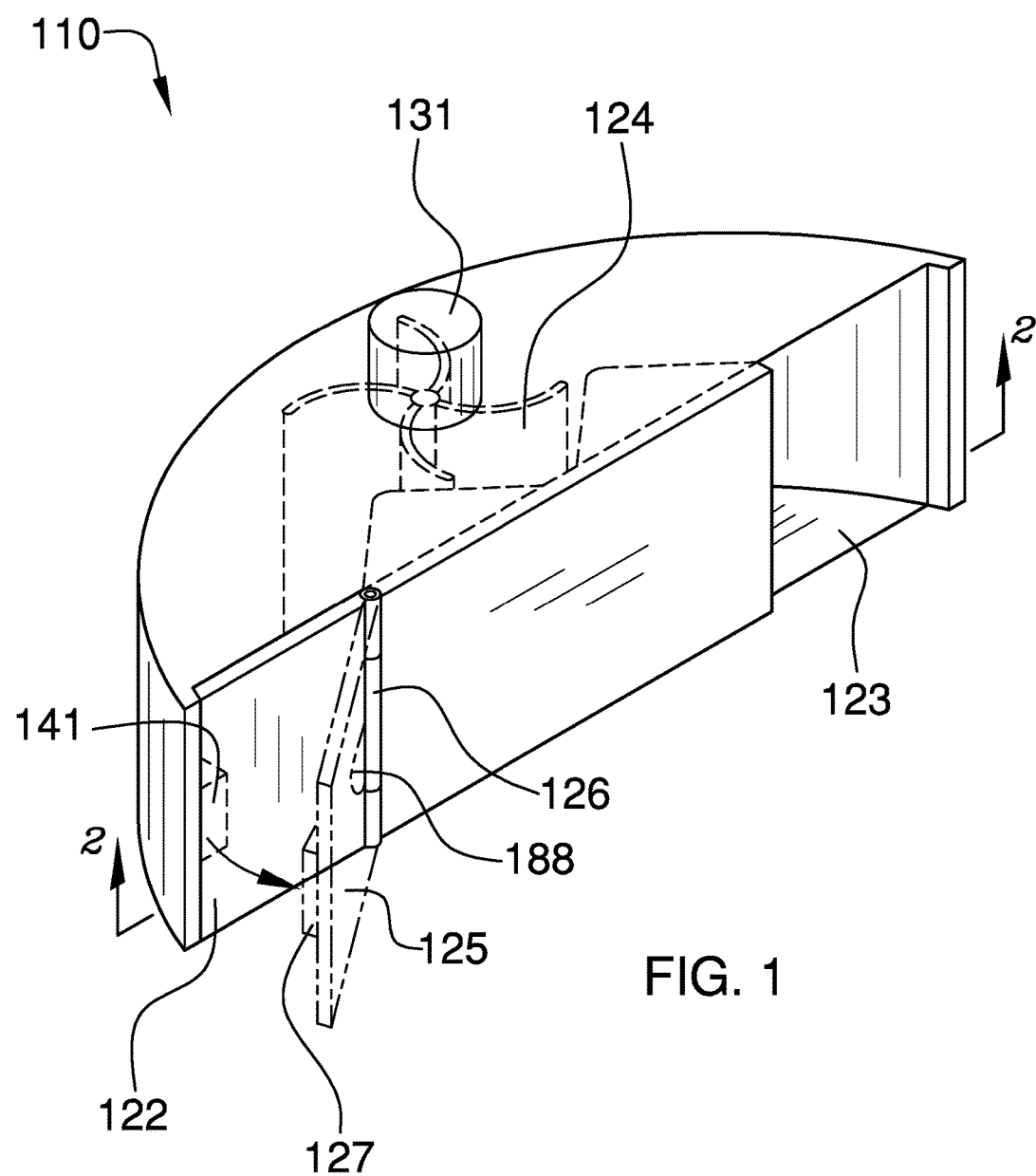
FIG. 1 is a perspective view of an embodiment of the disclosure.
Figure 2:
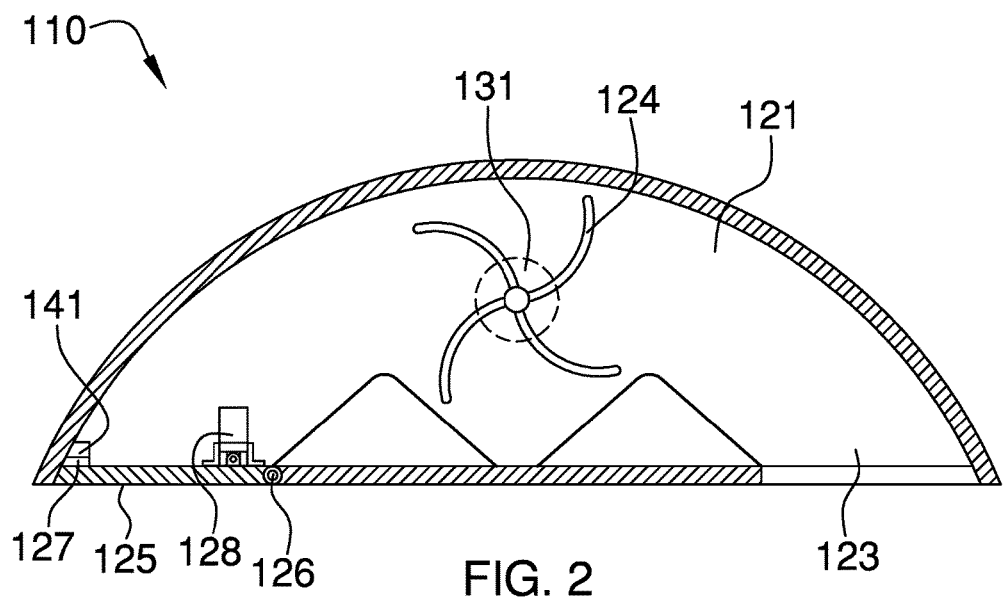
FIG. 2 is a closed cross-sectional view of an embodiment of the disclosure across 2-2 as shown in FIG. 1.
Figure 3:
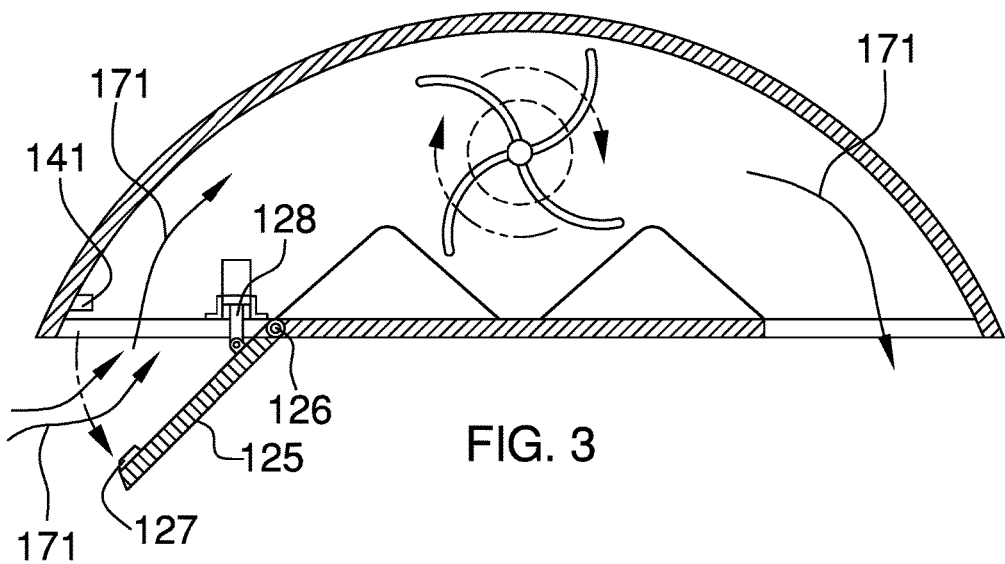
FIG. 3 is an open cross-sectional view of an embodiment of the disclosure across 2-2 as shown in FIG. 1.
Figure 4:
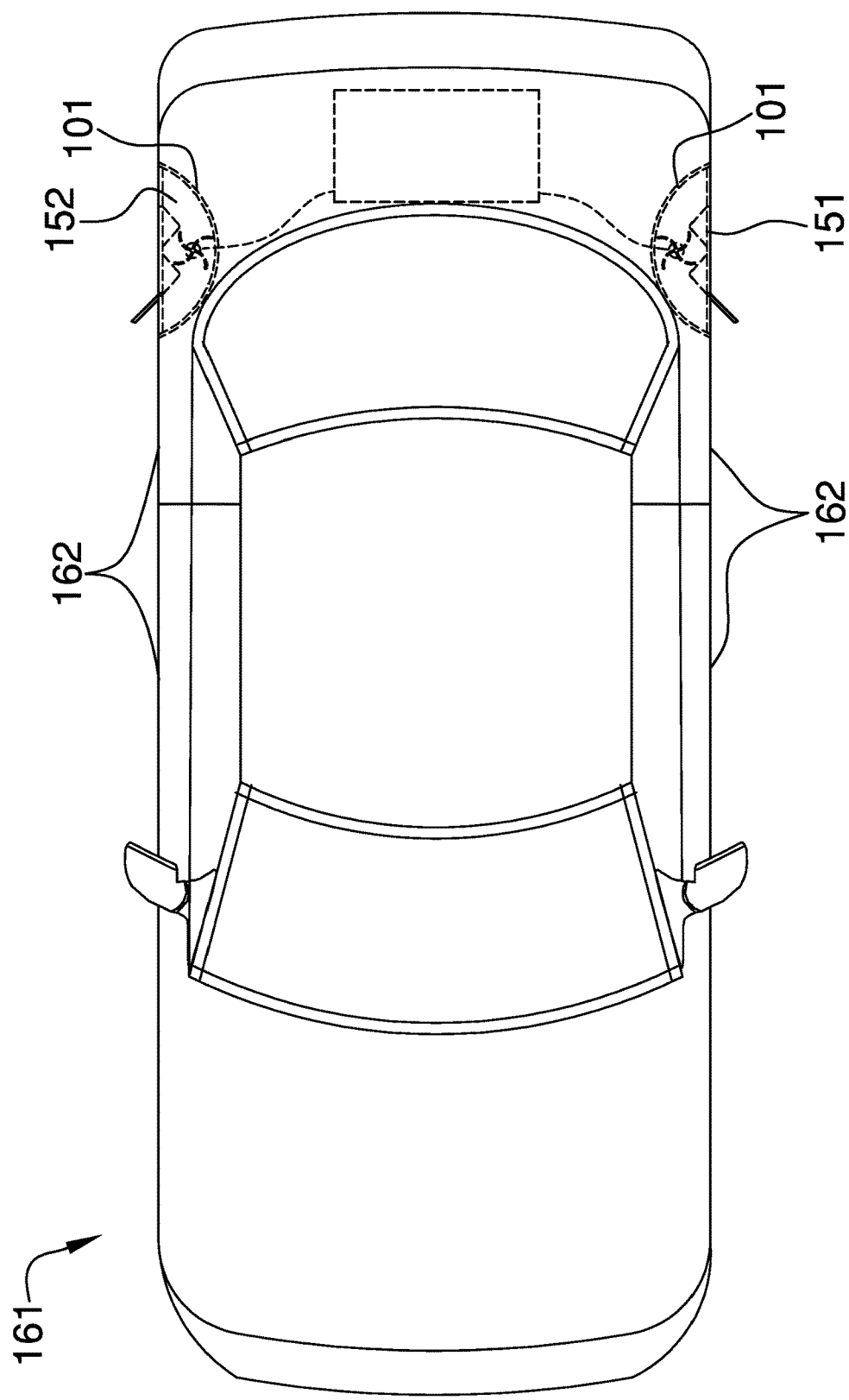
FIG. 4 is an in use view of an embodiment of the disclosure.
Figure 5:
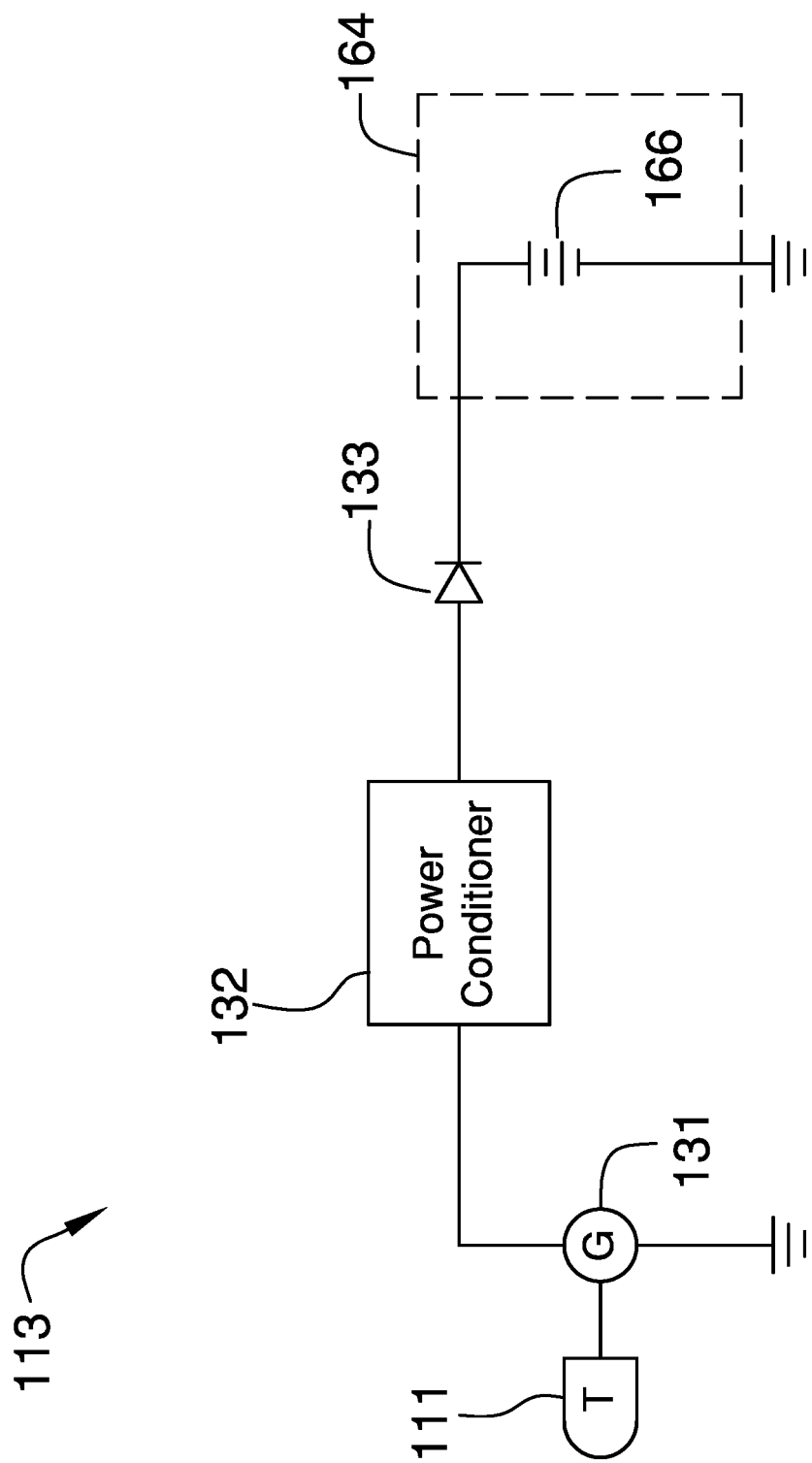
FIG. 5 is a schematic view of an embodiment of the disclosure.
Figure 6:
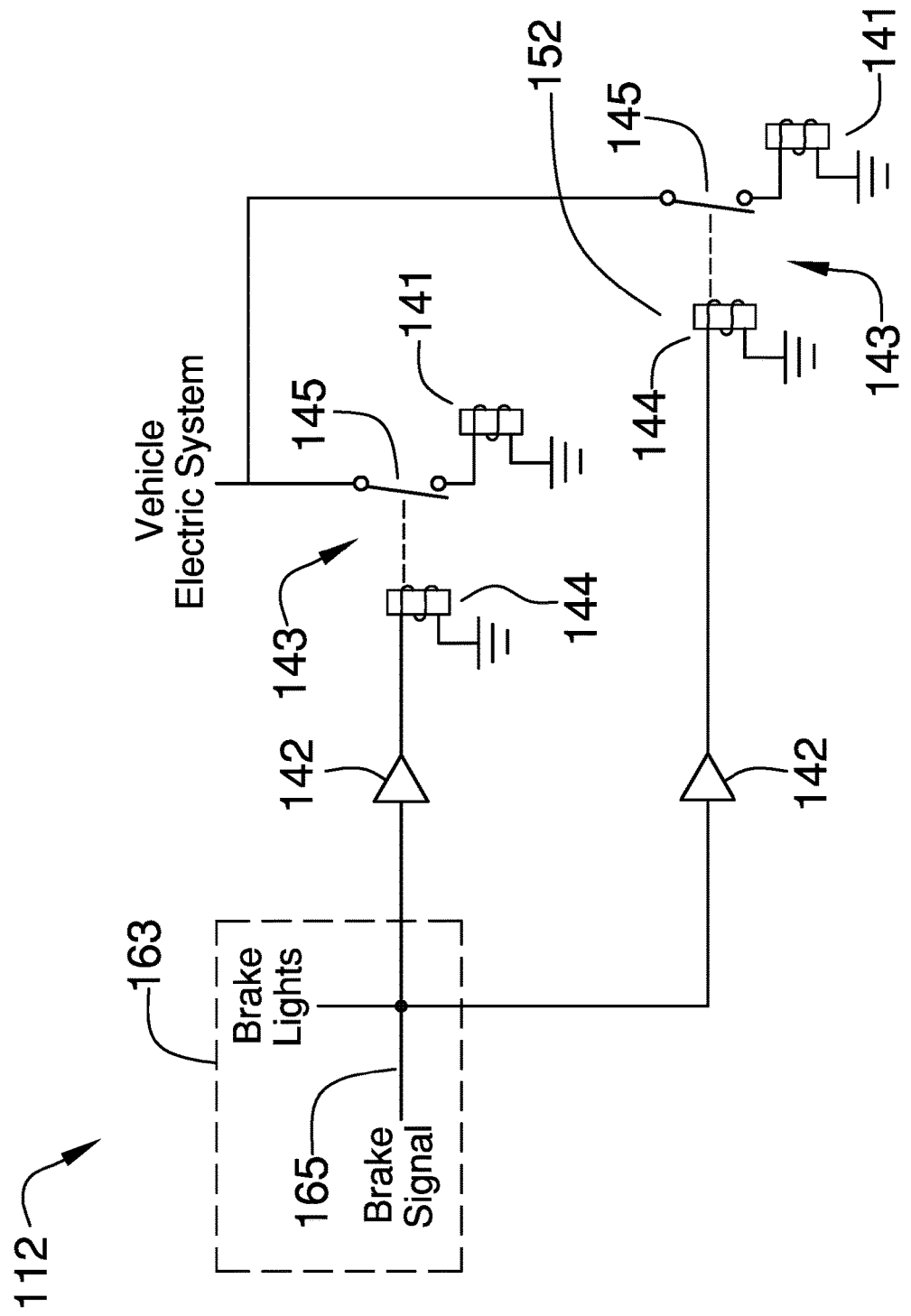
FIG. 6 is a schematic view of an embodiment of the disclosure.

Detailed reference will now be made to one or more potential embodiments of the disclosure, which are illustrated in FIGS. 1 through 6.

The vehicle turbine charging system 100 (hereinafter invention) is adapted for use with a vehicle 161. The vehicle 161 is further defined with one or more body panels 162, a brake system 163, and an electrical system 164. The electrical system 164 is further defined with a brake signal 165 and a battery 166. The invention 100 is a regenerative braking device. The operation of the invention 100 is initiated upon the application of the brake system 163 on the vehicle 161. The invention 100 comprises one or more regeneration devices 101. Each individual regeneration device 110 selected from the one or more regeneration devices 101 diverts air flow 171 from around the vehicle 161 through the wind turbine 111. Within this disclosure, the air flow 171 refers to a mass of air that is diverted from the exterior of the vehicle 161 through the wind turbine 111. The wind turbine 111 powers the regeneration circuit 112 to provide electrical energy that recharges battery 166. The control circuit 113 opens and closes the intake 122 that diverts the air flow 171 to the wind turbine 111. The intake 122 is open during brake system 163 operation and is otherwise closed.

Within this disclosure, the vehicle 161 is a motorized device that is used to transport passengers and cargo. Each of the one or more body panels 162 is a structure that forms the exterior surfaces of the vehicle 161. Each of the one or more regeneration devices 101 is mounted on an interior surface of a body panel selected from the one or more body panels 162. The brake system 163 is a device that that reduces the speed of the vehicle 161. In a regenerative braking device, the energy necessary to reduce the momentum of the vehicle 161 is captured and stored in such a manner that the energy can be subsequently reused in the operation of the vehicle 161.

The electrical system 164 comprises a source of electrical energy and a plurality of electrical devices that are used in the operation of the vehicle 161. The brake signal 165 is an electrical signal that is generated within the electrical system of the vehicle 161 when the brake system 163 is activated. The brake signal 165 typically illuminates the brake lights of the vehicle 161. The battery 166 is assumed to be a commercially available automobile battery 166. The chemical energy stored within the battery 166 is renewed and restored through use of the power conditioner 132. The power conditioner 132 is an electrical circuit that reverses the polarity of the battery 166 and provides the energy necessary to reverse the chemical processes that the battery 166 initially used to generate the electrical energy. This reversal of the chemical process creates a chemical potential energy that will later be used to generate electricity.

The invention 100 comprises one or more regeneration devices 101. The one or more regeneration devices 101 comprises a collection of one or more individual regeneration devices 110. Each of the one or more regeneration devices 101 is an individual regeneration device 110 that is installed within the one or more body panels 162. Each individual regeneration device 110 is a gas turbine that takes air flow 171 that is diverted from the air flowing around the vehicle 161 and converts the diverted air flow 171 into electricity that is used to charge the battery 166 of the electrical system 164 of the vehicle 161. The individual regeneration device 110 comprises a wind turbine 111, a regeneration circuit 112, and a control circuit 113.

In the first potential embodiment of the disclosure, the one or more regeneration devices 101 further comprises a left regeneration device 151 and a right regeneration device 152. the left regeneration device 151 is the regeneration device that is mounted on the left side of the vehicle 161. The right regeneration device 152 is the regeneration device that is mounted on the right side of the vehicle 161.

The wind turbine 111 is the physical structure through which the diverted air flow 171 is channeled. The diverted air flow 171 rotates a rotor 124 that is used to power the regeneration circuit 112. The wind turbine 111 comprises a wind tunnel 121, an intake 122, an outlet 123, and a rotor 124.

The wind tunnel 121 is a curved channel through which the air flow 171 passes. The curvature of the wind tunnel 121 is formed to allow (within reasonable engineering limits) for the laminar flow of the air flow 171. The wind tunnel 121 is mounted in a body panel selected from the one or more body panels 162.

The outlet 123 is a second port that is formed towards the rear side of the vehicle 161. The outlet 123 releases the air flow 171 from the wind tunnel 121 after the air flow 171 has passed through the wind tunnel 121.

The rotor 124 is a bladed rotating structure around which the air flow 171 flows. The air flow 171 passes the rotor 124 in a manner that rotates the rotor 124. The rotation of the rotor 124 powers the regeneration circuit 112 to generate electricity to charge the battery 166.

The intake 122 is a first port that is formed towards the forward side of the vehicle 161. The intake 122 receives the air flow 171 into the wind tunnel 121. The intake 122 comprises a door 125, a hinge 126, a ferromagnetic plate 127 and a spring 128. The door 125 is a movable cover that is used to close the intake 122 when the brake system 163 is not active. When the brake system 163 is activated the control circuit 113 opens the door 125. The opening of the door 125 allows the air flow 171 to enter the wind tunnel 121. As shown most clearly in FIG. 3, the door 125 is positioned on the intake 122 such that, when the door 125 is in the open position, the door 125 forms a baffle that routes the air flow 171 into the wind tunnel 121. The hinge 126 is a commercially available hinge 126 that attaches the door 125 to the intake 122 such that the door 125 can rotate towards or away from the intake 122 using the hinge as a pivot.

The ferromagnetic plate 127 is a rectangular block structure that is mounted on the door 125. The ferromagnetic plate 127 is attracted, and attached, to the magnetic device contained within the control circuit 113. When the ferromagnetic plate 127 is attached to the control circuit 113, the door 125 is in the closed position. The spring 128 is a commercially available torsion spring that is attached to both the door 125 and the intake 122 in such a manner that the spring 128 is in the relaxed state when the door 125 is open.

The regeneration circuit 112 is an electrical device that converts the rotational energy of the rotor 124 into electrical energy that is used to charge the battery 166 of the vehicle 161 electrical system 164. The regeneration circuit 112 comprises a generator 131, a power conditioner 132, a diode 133, and an electrical ground 134.

The generator 131 is a readily and commercially available electrical device that converts rotational energy into electrical energy. A generator 131 is often referred to as an alternator. The generator 131 is rotated by the rotor 124 to generate the electrical energy. The power conditioner 132 is a voltage regulation circuit that ensures that the electrical power generated by the generator 131 is within the voltages and tolerances required by the vehicle 161 electrical system 164. The diode 133 is an electrical device that prevents a reversal of electric current flow from the battery 166 into the power conditioner 132.

Within this disclosure, the electrical ground 134 provides a common electrical reference voltage that is used throughout the vehicle 161 and the invention 100. Stated more formally: all references to the electrical ground 134 within the specification, claims, or figures of this disclosure refer to the same, or a common, reference voltage.

The control circuit 113 is a magnetic device that is triggered by the brake signal 165 of the electrical system 164 of the vehicle 161. The control circuit 113 is a magnetic lock that magnetically holds the intake 122 closed until the brake system 163 of the vehicle 161 is activated. A brake signal 165 generated by the activation of the brake system 163 disables the magnetic lock of the control circuit 113 thereby opening the intake 122. The opening of the intake 122 allows air flow 171 to pass through the wind turbine 111 thereby rotating the rotor 124 to initiate the process of charging the battery 166. As shown most clearly in FIG. 6, upon discontinuation of the brake signal 165 the magnetic lock of the control circuit 113 is reengaged thereby closing the intake 122.

The magnetic device of the control circuit 113 and the ferromagnetic plate 127 are designed such that the operation of the magnetic device of the control circuit 113 will overcome the opposing force provided by the spring 128 when the ferromagnetic plate 127 is drawn towards the door

125. In a second potential embodiment of the disclosure, the use of the ferromagnetic plate 127 is avoided by forming the door 125 out of a ferromagnetic material.

The control circuit 113 comprises an electromagnet 141, an amplifier 142, a relay 143, and the electrical ground 134. The relay 143 is further defined with a relay coil 144 and a relay switch 145. The electromagnet 141 is a readily and commercially available electromagnet 141 that is used to attract the ferromagnetic plate 127 of the door 125. The amplifier 142 is a readily and commercially available amplifier 142 that is used as a buffer to isolate the electromagnet 141 from the brake signal 165.

The relay 143 is a readily and commercially available relay 143. The relay coil 144 is electrically connected to the amplifier 142 such that the initiation and discontinuation of the amplifier 142 by the brake signal 165 will open and close the relay switch 145 respectively. The relay switch 145 is a normally closed switch that is placed in series between the vehicle 161 electrical system 164 and the electromagnet 141 such that the electrical system 164 powers the electromagnet 141 when the relay coil 144 is unpowered.

Once installed as described within this disclosure, the operation of the invention 100 is automatic and does not require further intervention.

The following definitions and directional references were used in this disclosure:

Amplifier: As used in this disclosure, an amplifier refers to an electronic component that increases voltage, current, or power of an input signal. Specifically, within this disclosure, an amplifier refers to a differential amplifier. A differential amplifier is a device two input electrical device with a single output. A difference amplifier amplifies the voltage difference between the two inputs.

Baffle: As used in this disclosure, a baffle is a structure that is used to channel, inhibit or divert a gas or fluid flow.

Battery: As used in this disclosure, a battery is a container consisting of one or more cells, in which chemical energy is converted into electricity and used as a source of power.

Blade: As used in this disclosure, a blade is a term that is used to describe a wide and flat structure or portion of a structure larger structure such as a propeller.

Brake: As used in this disclosure, a brake is a device that is used to slow or stop the motion of a machine or a vehicle.

Channel: As used in this disclosure, a channel is a tubular passage through which an object or fluid is passed through.

Diode: As used in this disclosure, a diode is a two terminal semiconductor device that allows current flow in only one direction. The two terminals are called the anode and the cathode. Electric current is allowed to pass from the anode to the cathode.

Door: As used in this disclosure, a door is a movable or removable barrier that is attached to the wall of a room or the surface of a container for the purpose of allowing or preventing access through an aperture into the room or container.

Electrical Ground: As used in this disclosure, an electrical ground is a common reference voltage that is used in the design and implementation of electrical circuits. An electrical ground is often, but not necessarily, the discharge point of electric currents flowing through an electric circuit.

Electromagnet: As used in this disclosure, an electromagnet is a core formed from a magnetic material that has a coil formed from an electric current carrying conductor wrapped around it. When an electric current flows through the coil, The core exhibits magnetic properties when an electric current flows through the coil and exhibits no (or reduced) magnetic properties when electric current is not flowing through the coil.

Exterior: As used in this disclosure, the exterior is use as a relational term that implies that an object is not contained within the boundary of a structure or a space.

Ferromagnetic Material: As used in this disclosure, a ferromagnetic material is a material that is attracted to a magnet.

Generator: In this disclosure, a generator is a machine that converts rotational mechanical energy into electric energy.

Hinge: As used in this disclosure, a hinge is a device that permits the turning, rotating, or pivoting of a first object relative to a second object.

Interior: As used in this disclosure, the interior is use as a relational term that implies that an object is contained within the boundary of a structure or a space.

Magnet: As used in this disclosure, a magnet is an ore, alloy, or other material that has its component atoms arranged so the material exhibits properties of magnetism such as attracting other iron-containing objects or aligning itself in an external magnetic field.

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Pivot: As used in this disclosure, a pivot is a rod or shaft around which an object rotates or swings.

Port: As used in this disclosure, a port is an opening formed in an object that allows fluid to flow through the boundary of the object.

Relaxed Shape: As used in this disclosure, a structure is considered to be in its relaxed state when no shear, strain, or torsional forces are being applied to the structure.

Rotor: As used in this disclosure, a rotor is: 1) the bladed rotating part of a turbine; or, 2) the rotating part of an electric motor, electric generator, or an alternator.

Relay: As used in this disclosure, a relay is an automatic electromagnetic or electromechanical device that reacts to changes in voltage or current by opening or closing a switch in an electric circuit. Relays further defined with a coil and a switch. Applying a voltage to the coil, usually referred to as energizing the coil, will cause the coil to change the position of the switch.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Torsion Spring: As used in this disclosure, a torsion spring is a mechanical device that stores mechanical energy through an opposing torque when the mechanical device is twisted. The torsion spring will return to its original position when the twisting force is removed.

Turbine: In this disclosure, a turbine is a machine that converts the kinetic energy of a moving fluid or gas to rotational energy. In common usage, a turbine generally accomplishes this by forcing the moving fluid or gas through a series of blades arrayed around the circumference of a wheel or a cylinder. Alternative, a turbine can run in a reverse mode wherein externally provided rotational energy will be converted into kinetic energy that is expressed as the movement or compression of a fluid or gas.

Vehicle: As used in this disclosure, a vehicle is a motorized device that is used for transporting passengers, goods, or equipment. The term motorized refers to a vehicle can move under power provided by an electric motor or an internal combustion engine.

The directional references used in this disclosure correspond to the directional references from the perspective of the train. The front is the side of the train proximal to the normal direction of travel. The rear side is the side of the train that is distal from the front. The bottom side is the side of the train that is closest to the ground. The top side of the train is the side of the train that is distal to the bottom side. The left side is to the left side of a person facing the direction of normal, or forward travel. The right side is the side of the train that is distal from the left side.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A regenerative braking device comprising:
   wherein the regenerative braking device comprises one or more regeneration devices;
   wherein each individual regeneration device selected from the one or more regeneration devices diverts air flow from around the exterior of the vehicle;
   wherein the air flow refers to a mass of air that is diverted from the exterior of the vehicle through the wind turbine;
   wherein each individual regeneration device selected from the one or more regeneration devices converts the diverted air flow into electrical energy;
   wherein the regenerative braking device is configured for use with a vehicle;
   wherein the vehicle is further defined with one or more body panels, a brake system, and an electrical system;
   wherein each of the one or more body panels is a structure that forms the exterior surfaces of the vehicle;
   wherein the brake system is a device that that reduces the speed of the vehicle;
   wherein the electrical system comprises a source of electrical energy and a plurality of electrical devices that are used in the operation of the vehicle;
   wherein the electrical system is further defined with a brake signal and a battery;
   wherein the operation of the regenerative braking device is initiated upon the application of the brake system of the vehicle;
   wherein each individual regeneration device comprises a wind turbine, a regeneration circuit, and a control circuit;
   wherein the wind turbine powers the regeneration circuit to provide electrical energy that recharges the battery;
   wherein the control circuit opens and closes an intake that diverts the air flow into the wind turbine;
   wherein the intake is open during brake system operation and is otherwise closed;
   wherein each of the one or more regeneration devices is mounted on an interior surface of a body panel selected from the one or more body panels;
   wherein the wind turbine is the physical structure through which the diverted air flow is channeled;
   wherein the wind turbine comprises a wind tunnel, an intake, an outlet, and a rotor;
   wherein the wind tunnel is a curved channel through which the diverted air flow passes;
   wherein the diverted air flow rotates the rotor that is used to power the regeneration circuit;
   wherein the intake is a first port that receives the diverted air flow into the wind tunnel;
   wherein the outlet is a second port that expels the diverted air flow from the wind tunnel;
   wherein the regeneration circuit is an electrical device that converts the rotational energy of the rotor into electrical energy that is used to charge the battery of the vehicle electrical system;
   wherein the regeneration circuit comprises a generator, a power conditioner, and a diode;
   wherein the generator, the power conditioner and the diode are electrically interconnected;
   wherein the control circuit is a magnetic lock that magnetically holds the intake closed;
   wherein the brake signal generated by the activation of the brake system disables the magnetic lock of the control circuit thereby opening the intake;
   wherein upon discontinuation of the brake signal the magnetic lock of the control circuit is reengaged thereby closing the intake;
   wherein the wind tunnel is mounted in a body panel selected from the one or more body panels;
   wherein the rotor is a bladed rotating structure;
   wherein the rotation of the rotor powers the regeneration circuit;
   wherein the intake comprises a door, a hinge, a ferromagnetic plate and a spring;
   wherein the door is a movable cover that is used to close the intake when the brake system is not active;
   wherein when the control circuit opens the door;
   wherein the opening of the door allows the air flow to enter the wind tunnel;
   wherein the door forms a baffle that routes the air flow into the wind tunnel;
   wherein the hinge attaches the door to the intake such that the door can rotate towards or away from the intake using the hinge as a pivot;
   wherein the ferromagnetic plate is a rectangular block structure that is mounted on the door;
   wherein the ferromagnetic plate attaches to the magnetic device contained within the control circuit;
   wherein when the ferromagnetic plate attaches to the control circuit;
   wherein the spring is a torsion spring that attaches to both the door and the intake in such a manner that the spring is in the relaxed state when the door is open;
   wherein the power conditioner is a voltage regulation circuit;
   wherein the power conditioner reverses the polarity of the battery;

wherein the power conditioner provides the energy necessary to reverse the chemical processes that the battery uses to generate electrical energy;

wherein the generator is an electrical device that converts rotational energy into electrical energy;

wherein the generator is rotated by the rotor;

wherein the diode is an electrical device;

wherein the diode is wired to prevent a reversal of electric current flow from the battery into the power conditioner;

wherein the magnetic device of the control circuit and the ferromagnetic plate are designed such that the operation of the magnetic device of the control circuit will overcome the opposing force provided by the spring when the ferromagnetic plate is drawn towards the door;

wherein the control circuit comprises an electromagnet, an amplifier, and a relay;

wherein the relay is further defined with a relay coil and a relay switch;

wherein the brake signal, the electromagnet, the amplifier and the relay are electrically interconnected.

2. The regenerative braking device according to claim 1 wherein the electromagnet is the magnetic device that attracts the ferromagnetic plate of the door.

3. The regenerative braking device according to claim 2 wherein the amplifier is a buffer that isolates the electromagnet from the brake signal.

4. The regenerative braking device according to claim 3 wherein the relay coil is electrically connected to the amplifier such that the initiation and discontinuation of the amplifier by the brake signal will open and close the relay switch respectively.

5. The regenerative braking device according to claim 4 wherein the relay switch is a normally closed switch that is placed in series between the vehicle electrical system and the electromagnet such that the electrical system powers the electromagnet when the relay coil is unpowered.

6. The regenerative braking device according to claim 5 wherein the one or more regeneration devices further comprises a left regeneration device and a right regeneration device;

wherein the left regeneration device is the regeneration device that is mounted on the left side of the vehicle;

wherein the right regeneration device is the regeneration device that is mounted on the right side of the vehicle.

* * * * *